(12) United States Patent
Lin (10) Patent No.: US 10,642,509 B2
(45) Date of Patent: May 5, 2020

(54) METHOD FOR DESIGNATING SPECIFIC WORLD-LINES OF DATA STORAGE DEVICE AS RESERVED WORLD-LINES, AND SELECTING A WRITING MODE ACCORDINGLY

(71) Applicant: Silicon Motion Inc., Hsinchu County (TW)

(72) Inventor: Sheng-Liu Lin, Hsinchu (TW)

(73) Assignee: Silicon Motion, Inc., Hsinchu County (TW)

( * ) Notice: Subject to any disclaimer, the term of this patent is extended or adjusted under 35 U.S.C. 154(b) by 82 days.

(21) Appl. No.: 15/889,217

(22) Filed: Feb. 6, 2018

(65) Prior Publication Data

US 2019/0129629 A1 May 2, 2019

(30) Foreign Application Priority Data

Nov. 2, 2017 (TW) .............................. 106137873 A (51) Int. Cl.
*G06F 3/06* (2006.01)
*G06F 12/02* (2006.01)

(52) U.S. Cl.
CPC ............ *G06F 3/0619* (2013.01); *G06F 3/065* (2013.01); *G06F 3/0634* (2013.01);
(Continued)

(58) Field of Classification Search
None
See application file for complete search history.

(56) References Cited

U.S. PATENT DOCUMENTS

2008/0177933 A1* 7/2008 Nobunaga .............. G11C 29/76
711/103
2008/0301256 A1 12/2008 McWilliams
(Continued)

FOREIGN PATENT DOCUMENTS

TW          I244587        12/2005
TW         200821909        5/2008

OTHER PUBLICATIONS

Machine translation of CN101339537 (Year: 2009).*
(Continued)

*Primary Examiner* — Charles Rones
*Assistant Examiner* — Hewy H Li
(74) *Attorney, Agent, or Firm* — Winston Hsu (57) ABSTRACT

A method for controlling operations of a data storage device, the associated data storage device and the controller thereof are provided. The method can comprise: selecting a block of multiple blocks of a non-volatile (NV) memory element of a plurality of NV memory elements; receiving a data-writing command from a host device; generating a plurality of operating commands corresponding to the data-writing command, and sending the plurality of operating commands to the NV memory to perform data-writing on a plurality of non-reserved word-lines of the block, wherein the block comprises the plurality of non-reserved word-lines and a plurality of reserved word-lines, and each non-reserved word-line of the plurality of non-reserved word-lines comprises multiple pages; and writing user data into a reserved word-line of the plurality of reserved word-lines through a single level cell (SLC) writing mode, to make the reserved word-line comprise a single page.

10 Claims, 7 Drawing Sheets

(52) U.S. Cl.
CPC .......... *G06F 3/0659* (2013.01); *G06F 3/0679* (2013.01); *G06F 12/02* (2013.01)

(56) References Cited

U.S. PATENT DOCUMENTS

| | | |
|---|---|---|
| 2009/0235146 A1 | 9/2009 | Tan |
| 2011/0214039 A1 | 9/2011 | Steiner |
| 2014/0006688 A1* | 1/2014 | Yu .......................... G11C 16/10 711/103 |
| 2016/0141047 A1* | 5/2016 | Sehgal ............... G11C 16/3427 365/185.02 |
| 2016/0322108 A1* | 11/2016 | Yang ...................... G11C 16/10 |
| 2018/0315487 A1* | 11/2018 | Avraham ............. G11C 16/349 |

OTHER PUBLICATIONS

Cai, Yu, et al. "Error characterization, mitigation, and recovery in flash-memory-based solid-state drives." Proceedings of the IEEE 105.9 (Aug. 18, 2017): 1666-1704. (Year: 2017).*

Wei, Debao, et al. "PEVA: A page endurance variance aware strategy for the lifetime extension of NAND flash." IEEE Transactions on Very Large Scale Integration (VLSI) Systems 24.5 (2015): 1749-1760. (Year: 2015).*

Wang, Chundong, and Weng-Fai Wong. "Extending the lifetime of NAND flash memory by salvaging bad blocks." Proceedings of the Conference on Design, Automation and Test in Europe. EDA Consortium, 2012. (Year: 2012).*

\* cited by examiner

METHOD FOR DESIGNATING SPECIFIC WORLD-LINES OF DATA STORAGE DEVICE AS RESERVED WORD-LINES, AND SELECTING A WRITING MODE ACCORDINGLY

BACKGROUND OF THE INVENTION

1. Field of the Invention

The present invention relates to flash memory access, and more particularly, to a method for controlling the operations of a data storage device, and an associated data storage device, and a controller thereof.

2. Description of the Prior Art

In recent years, due to the continuous development of memory technology, a variety of portable or non-portable data storage devices (for example, SD/MMC, CF, MS, XD, or UFS standard memory cards; for another example, solid state disk (SSD); for another example, an embedded storage device conforming to UFS or EMMC specifications) is widely implemented in many applications. Therefore, the access control of memory in these data storage devices has become a rather hot topic.

The commonly used NAND flash memory mainly comprise single level cell (SLC) and multiple level cell (MLC) flash memories. Each transistor in the SLC flash memory is treated as a memory cell with only two charge values, representing the logic 0 and the logic 1, respectively. In addition, the storage capacity of each transistor in the MLC flash memory, which is treated as a memory cell, is fully utilized by being driven at a higher voltage to record at least two sets of bit information (such as 00, 01, 11, 10) in a transistor through different levels of voltage. Theoretically, the recording density of MLC flash memory can reach at least twice the recording density of SLC flash memory, and is therefore preferred by manufacturers of NAND flash memories who have encountered the bottleneck in the development process.

The lower cost and larger capacity of the MLC flash memory means it is more likely to be applied in portable memory devices than an SLC flash memory. However, the MLC flash memory does have instability issues. In order to ensure that the data storage device can control access to the flash memory in compliance with the relevant specifications, the flash memory controller usually has some management mechanism to properly manage data access.

According to the associated art, there are some deficiencies in the data storage device having these management mechanisms. For example, when a flash memory is manufactured by using a new technology, the Bit Error Rate (BER) of the first last word-line and the last word-line of a block can be significantly greater than the BER of other word-lines in the same block, which can cause the block to be easily identified as a bad block. If many blocks have the similar problems, the lifetime of the data storage device can become very short. Therefore, there is a requirement for a novel method and associated architecture to enhance the performance of a data storage device without side effects or with less likely side effects.

SUMMARY OF THE INVENTION

It is therefore one of the objectives of the present invention to provide a method for controlling the operations of a data storage device and an associated data storage device and a controller thereof to solve the above problems.

It is another object of the present invention to provide a method for controlling the operations of a data storage device and an associated data storage device and a controller thereof to achieve the optimal performance of the data storage device without side effects or less likely to cause the side effects.

According to a first aspect of the present invention, an exemplary method for controlling the operations of a data storage device is disclosed, wherein the data storage device comprises a non-volatile (NV) memory, and the NV memory comprises a number of NV memory elements. The method can comprise: selecting a block of multiple blocks of a NV memory element of the plurality of NV memory elements; receiving a data-writing command from a host device, wherein the data-writing command is one of a plurality of host device commands from the host device; generating a plurality of operating commands corresponding to the data-writing command, and sending the plurality of operating commands to the NV memory to perform data-writing on a plurality of non-reserved word-lines of the block, wherein the block comprises the plurality of non-reserved word-lines and a plurality of reserved word-lines, and each non-reserved word-line of the plurality of non-reserved word-lines comprises multiple pages; and writing user data into a reserved word-line of the plurality of reserved word-lines through a single level cell (SLC) writing mode, to make the reserved word-line comprise a single page.

According to a second aspect of the present invention, an exemplary data storage device is disclosed. The storage device can comprises: a non-volatile (NV) memory, for storing information, wherein the NV memory comprises a plurality of NV memory elements; and a controller, coupled to the NV memory, for controlling operations of the data storage device, wherein the controller comprises: a processing circuit, for controlling the controller according to a plurality of host device commands from a host device to allow the host device to access the NV memory through the controller, wherein: the controller selects a block of a plurality of blocks of a NV memory element of the plurality of NV memory elements; the controller receives a data-writing command from a host device, wherein the data-writing command is one of a plurality of host device commands from the host device; the controller generates a plurality of operating commands corresponding to the data-writing command, and sends the plurality of operating commands to the NV memory to perform data-writing on a plurality of non-reserved word-lines of the block, wherein the block comprises the plurality of non-reserved word-lines and a plurality of reserved word-lines, and each non-reserved word-line of the plurality of non-reserved word-lines comprises multiple pages; and the controller writes user data into a reserved word-line of the plurality of reserved word-lines through a single level cell (SLC) writing mode, to make the reserved word-line comprise a single page.

According to a third aspect of the present invention, an exemplary controller of a data storage device comprising the controller and a non-volatile (NV) memory comprising a plurality of NV memory elements is disclosed. The controller can comprises: a processing circuit, for controlling the controller according to a plurality of host device commands from a host device to allow the host device to access the NV memory through the controller, wherein: the controller selects a block of a plurality of blocks of a NV memory element of the plurality of NV memory elements; the controller receives a data-writing command from a host device, wherein the data-writing command is one of a plurality of host device commands from the host device; the controller generates a plurality of operating commands corresponding to the data-writing command, and sends the plurality of operating commands to the NV memory to perform data-writing on a plurality of non-reserved word-lines of the block, wherein the block comprises the plurality of non-reserved word-lines and a plurality of reserved word-lines, and each non-reserved word-line of the plurality of non-reserved word-lines comprises multiple pages; and the controller writes user data into a reserved word-line of the plurality of reserved word-lines through a single level cell (SLC) writing mode, to make the reserved word-line comprise a single page.

According to a fourth aspect of the present invention, an exemplary method of data writing is disclosed, wherein the method is applicable to a data storage device. The method can comprise: selecting a block as an active block, the block being selected from a plurality of blocks comprised in the data storage device; dividing a plurality of word-lines of the active block into at least one reserved word-line and a plurality of non-reserved word-lines; programming a first type of data to the non-reserved word-lines in a preset writing mode; and programming a second type of data to the at least one reserved word-line in a non-preset writing mode, wherein the preset writing mode is programmable with more data to any word-line of the word-lines than the non-preset writing mode.

According to a fifth aspect of the present invention, an exemplary method of data writing is disclosed, wherein the method is applicable to a data storage device. The method can comprise: selecting a block as an active block, the block being selected from a plurality of blocks comprised in the data storage device; and dividing a plurality of word-lines of the active block into at least one reserved word-line and a plurality of non-reserved word-lines, wherein a data storage volume of any word-line of the non-reserved word-lines is higher than that of any word-line of the at least one reserved word-line.

According to a fifth aspect of the present invention, an exemplary data storage device is disclosed. The data storage device can comprise: a non-volatile (NV) memory, acting as a plurality of blocks of a storage medium, each of the blocks has a plurality of word-lines; and at least one of the blocks, designated as at least one data block, wherein the word-lines of the at least one data block are divided into at least one reserved word-line and a plurality of non-reserved word-lines, and a data storage volume of any word-line of the non-reserved word-lines is higher than that of any word-line of the at least one reserved word-line.

One of the advantages of the present invention is that it is managed through reserved word-lines and the present invention can properly control the operations of the controller to avoid shortening the lifetime of the data storage device. In addition, almost no additional cost is required for the implementation of the embodiments of the present invention. Therefore, the problems of the associated art can be solved without increasing the overall cost much. In contrast to the associated art, the present invention can achieve the optimal performance of a data storage device without side effects or less likely to cause side effects.

These and other objectives of the present invention will no doubt become obvious to those of ordinary skill in the art after reading the following detailed description of the preferred embodiment that is illustrated in the various figures and drawings.

DETAILED DESCRIPTION

I. Memory System

Figure 1:
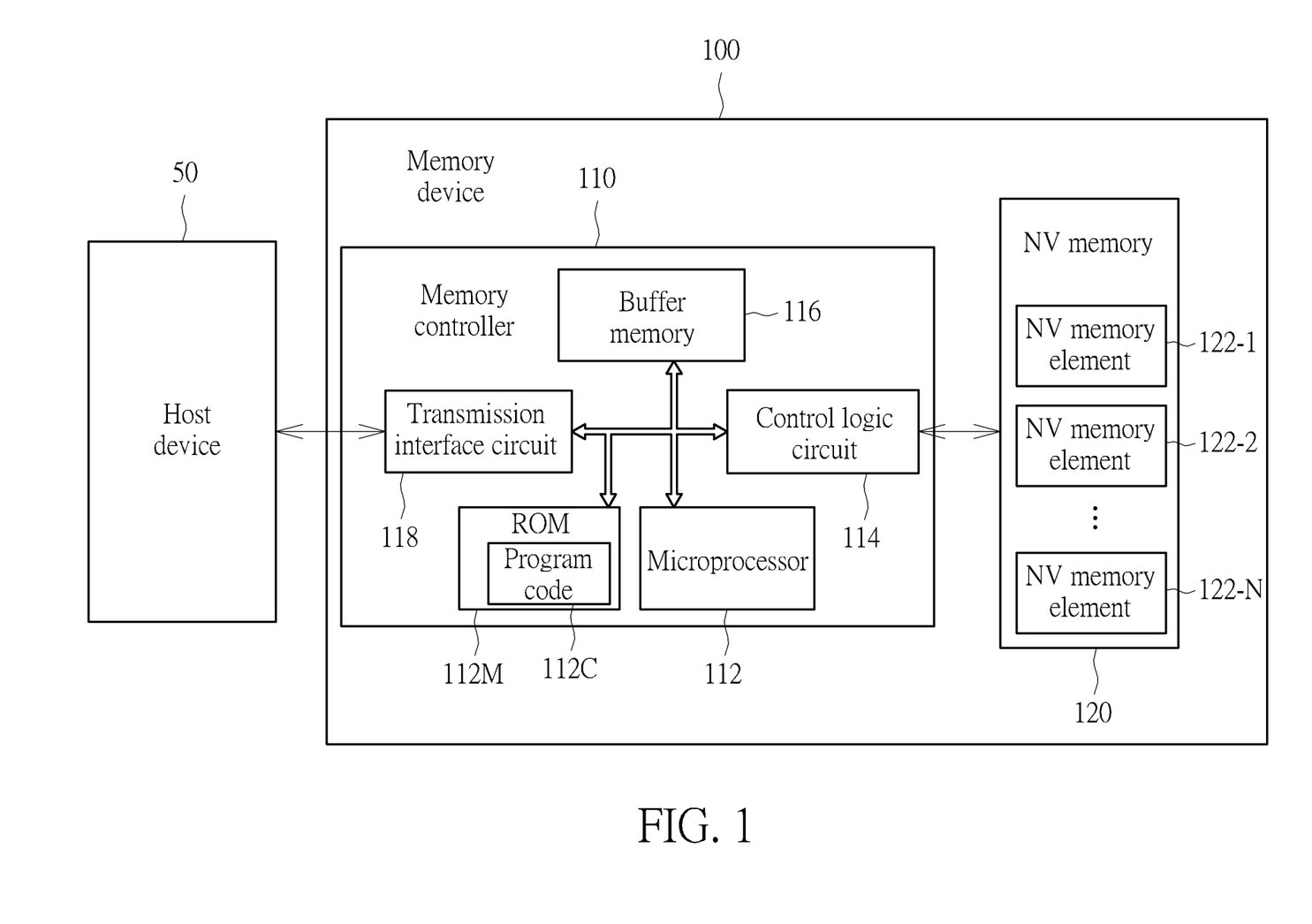
FIG. 1 is a schematic diagram of a data storage device and a host device according to a first embodiment of the present invention.

Please refer to FIG. 1. FIG. 1 is a schematic diagram of a data storage device 100 and a host device 50 according to a first embodiment of the present invention. For example, the data storage device 100 can be a portable data storage device (for example, a memory card conforming to the SD/MMC, CF, MS, or XD standard) or a solid state drive (SSD). In addition, examples of the host device 50 can comprise (but are not limited to) a multifunctional mobile phone, a tablet, a wearable device, and a personal computer such as a desktop computer and a laptop. According to this embodiment, the data storage device 100 can comprise a controller such as the memory controller 110, and can further comprise a NV memory 120, wherein the controller is configured to access the NV memory 120, and the NV memory 120 is configured to store information. The NV memory 120 can comprise a plurality of NV memory elements 122-1, 122-2, ... and 122-N, wherein the symbol "N" can represent a positive integer greater than one. For example, the NV memory 120 can be a flash memory, and the NV memory elements 122-1, 122-2, ... and 122-N can respectively be a plurality of flash memory chips or a plurality of flash memory dies, but the present invention is not limited thereto.

As shown in FIG. 1, the memory controller 110 can comprise a processing circuit such as a microprocessor 112, a memory such as a read only memory (ROM) 112M, a control logic circuit 114, a buffer memory 116, and transmission interface circuit 118, wherein these components may be coupled to one another via a bus. The buffer memory 116 is implemented with a random access memory (RAM). Further, the ROM 112M of this embodiment is arranged to store a program code 112C, and the microprocessor 112 is arranged to execute the program code 112C in order to control access of the NV memory 120. Note that the program code 112C may also be stored in the buffer memory 116 or in any type of memory. In addition, the control logic circuit 114 may comprise an error correction code (ECC) circuit (not shown) for protecting data and/or performing error correction, and the transmission interface circuit 118 may conform to a specific communications specification (e.g. the serial advanced technology attachment (SATA) specification, the universal serial bus (USB) specification, or the peripheral component interconnect express (PCIE) specification), and may perform communications according to this specific communications specification.

In this embodiment, the host device 50 can indirectly access the NV memory 120 in the data storage device 100 by sending a plurality of host device commands and corresponding logical addresses to the memory controller 110 Body 120. The memory controller 110 receives the plurality of host device commands and the logical address, and respectively translates the plurality of host device commands into memory operation commands (referred to as operation commands for short), and then controls the NV memory 120 to perform reading, writing/programming, or erasing on memory units or pages having a specific physical address within the NV memory 120, wherein the physical address corresponds to a logical address.

II. Novel Method Using a Number of Reserved Word-Lines-Lines

There are various techniques for manufacturing the NV memory 120, for example, a 2D/planar NAND Flash technology in which memory cells are arranged in a single layer, and a 3D NAND Flash technology in which memory cells are arranged in multiple layers and vertically stacked. According to some embodiments, the NV memory 120 can be implemented as a planar NAND flash architecture having a single layer of memory cells. According to some embodiments, the NV memory 120 can be implemented as a 3D NAND flash architecture having memory cells stacked vertically in multiple layers.

Figure 2:
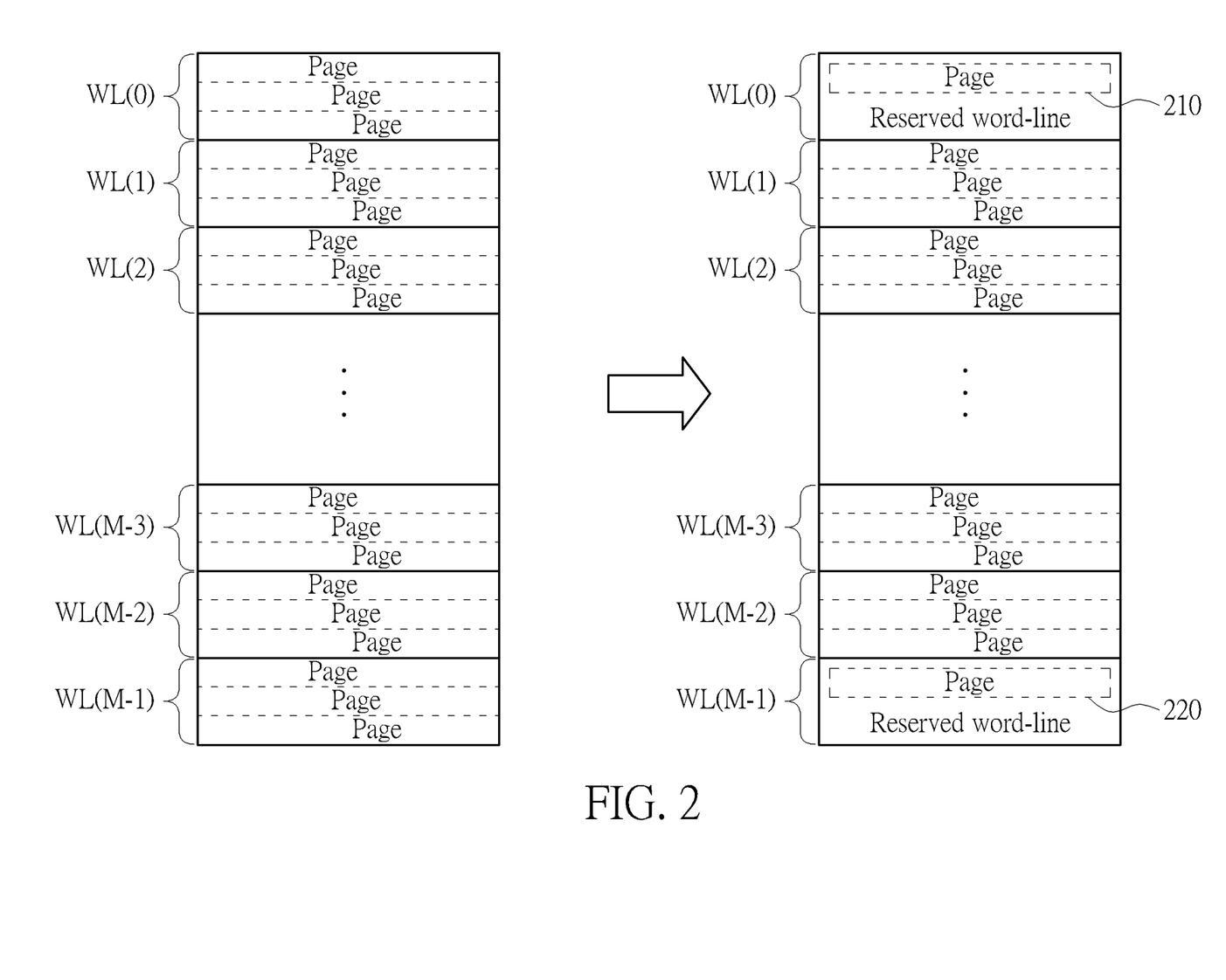
FIG. 2 is a schematic diagram of a method for controlling the operations of a data storage device according to an embodiment of the present invention.

FIG. 2 is a schematic diagram of a method for controlling the operations of a data storage device according to an embodiment of the present invention. The method is applicable to the data storage device 100, and is applicable to the controller such as the memory controller 110. For example, the NV memory elements 122-1, 122-2, . . . and 122-N can be triple-level cell (TLC) NV memory elements and any NV memory element 122-n (the symbol "n" can represent any integer in the interval [1, N]) of the elements 122-1, 122-2, . . . and 122-N can comprise a plurality of blocks, wherein N is a positive integer. One block comprising M word-lines {WL(0), WL(1), WL(2), . . . WL(M-3), WL(M-2), WL(M-1)} can be taken as an example of any one of the plurality of blocks, wherein M is a positive integer such as 256. The memory controller 110 can write the user data to one page of a word-line in the block by using the TLC writing mode (as a preset writing mode). In other words, a word-line can store three pages of user data.

As shown in the left half of FIG. 2, it is assumed that the writing operations for each word-line in the block is performed in the TLC writing mode. It can be okay to do this way (using this TLC writing mode for the writing operations of every word-line in that block) with the planar NAND flash architecture without any problems. However, in the case of implementing the flash memory in the above-described 3D NAND flash architecture, doing this way (using this TLC writing mode for the writing operations of every word-line in that block) can cause the block to be easily identified as a bad block due to the characteristics of the 3D NAND flash architecture. This method of the present invention can avoids this problem. As shown in the right half of FIG. 2, in the case wherein the NV memory 120 is implemented by the above-described 3D NAND flash architecture, the memory controller 110 operating according to this method can utilize the first word-line such as the word-line WL(0) and the last word-line (such as the word-line WL(M-1)) as the reserved word-lines, and in particular, through a single level cell (SLC) writing mode to write the user data to the first word-line (such as the word-line WL(0)) and the last word-line (such as the word-line WL(M-1)) or to write only the user data to a page (or single page writing) of the first word-line and the last word-line, to make the word-line WL(0) comprise a single page 210 and the word-line WL(M-1) comprise a single page 220 to effectively reduce the number of error bits of the user data stored in the word-line and the last word-line, so as to make the block no longer easily judged as a bad block. In addition, the first word-line and the last word-line can still be used to store and write the user data, but it is better to save the end-of-block information (EOB information).

Figure 3:
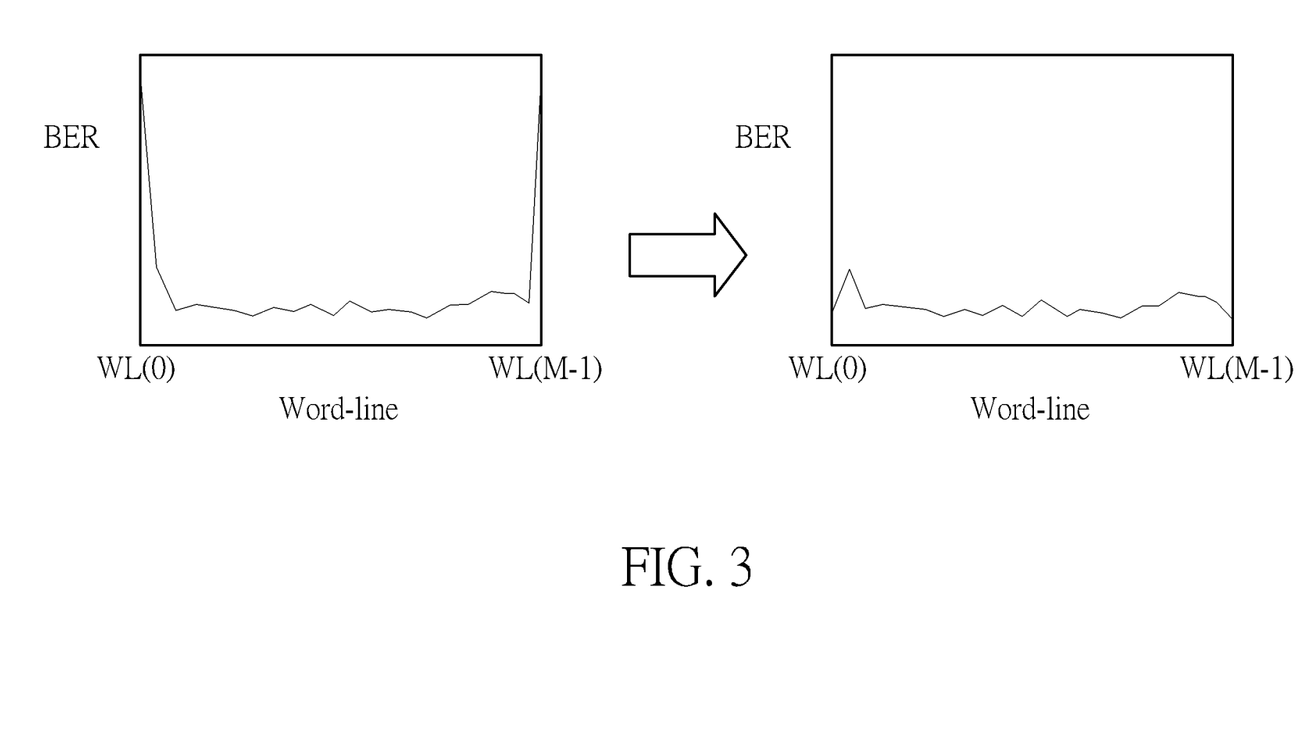
FIG. 3 shows the improvement of bit error rate (BER) achieved by the method shown in FIG. 2.

FIG. 3 shows the improvement of the bit error rate (BER) achieved by the method shown in FIG. 2. As shown in the left half of FIG. 3, it is assumed that the writing operations of each word-line in the block is performed by using the TLC writing mode, wherein the flash memory is implemented by the above-mentioned planar NAND flash architecture. In this case, the bit error rates of the first word-line (such as the word-line WL(0)) and the last word-line (such as the word-line WL(M-1)) are significantly larger than the bit error rates of the other word-lines. In order to overcome such physical characteristics, some algorithms in the associated art usually need to be changed. In particular, the number of executions of a read-retry program is increased, and the operating parameters of the flash memory are changed. In contrast, the above method of the present invention can avoid the problems of the associated art. Since the memory controller 110 can treat the first word-line (such as the word-line WL(0)) and the last word-line (such as the word-line WL(M-1)) as a reserved word-line and use the SLC writing mode for the operations, or only perform the single page writing, the method can suppress the bit error rate of the first word-line (such as the word-line WL(0)) and the last word-line (such as the word-line WL(M-1). As shown in the right half of FIG. 3, the user can write the user data to multiple word-lines (for example, the first and second word-lines (such as the word-lines WL(0) and WL(1)) and the last two word-lines (such as the word-lines WL(M-2) and WL(M-1)) by using the SLC writing mode or the single page writing, so as to attain the similar purpose.

Figure 4:
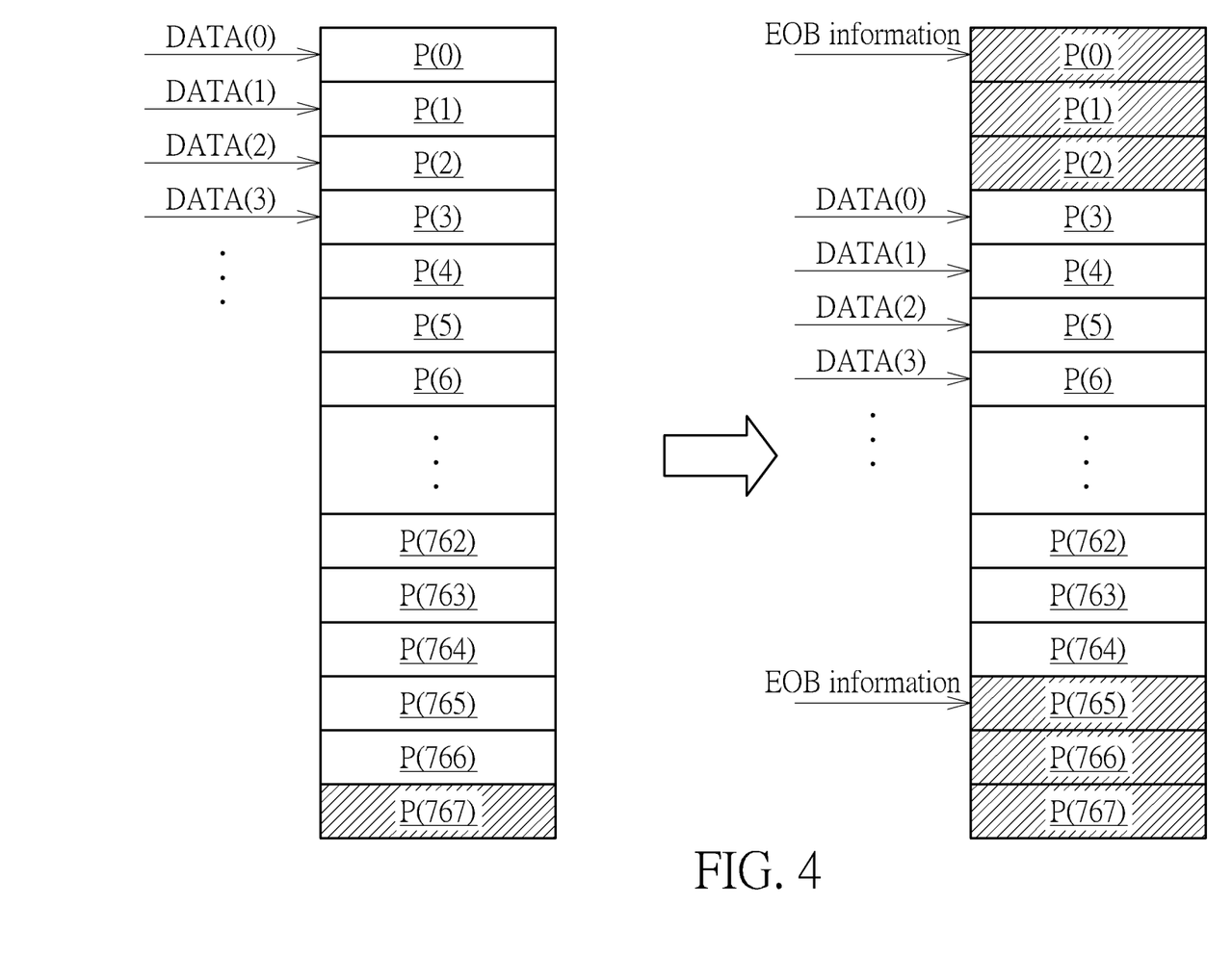
FIG. 4 shows a data writing sequence of the method shown FIG. 2 according to an embodiment.

FIG. 4 shows a data writing sequence of the method shown FIG. 2 according to an embodiment. From the viewpoint of the data page, the word-line WL(0) can comprise three pages such as pages {P(0), P(1), P(2)} and the word-line WL(1) can comprise three pages such as pages P(3), P(4), P(5)}, and so on. For example, the block can comprise pages {P(0), P(1), P(2), P(3), P(4), P(5), P(6), . . . P(763), P(764), P(765), P(766), P(767)}. As shown in the left half of FIG. 4, it is assumed that writing operations for each word-line in the block is performed by using the TLC writing mode, wherein the flash memory is implemented by the above planar NAND flash architecture. In this situation, a series of data such as the user data {DATA(0), DATA(1), DATA(2), DATA(3), . . . } are usually written starting from page P(0), and the user data can be stored in most of the pages of the block up to the page P(766), and finally, the End of Block (EOB) information is written to P(767). In contrast, the above method of the present invention can write the user data into a plurality of non-reserved word-lines such as word-lines {WL(1), . . . WL(M-2)}, which in this embodiment can correspond to the pages {{P(3), P(4), P(5)}, . . . {P(762), P(763), P(764)}}. As shown in the right half of FIG. 4, when the user data {DATA(0), DATA(1), DATA(2), DATA(3), . . . } is to be written into this block, the memory controller 110 can start to write from the page P(3). For the plurality of reserved word-lines (for example, the first word-line and the last word-line of the block), the memory controller 110 can change to the SLC writing mode or only perform the single page writing.

In practice, the present invention can achieve the above object by setting the programming sequence of the blocks. The programming sequence can be an array or a table listing the physical addresses that should be stored for the user data, wherein the physical addresses can be consecutive page numbers, that is, {P(3), P(4), P(5), ... P(764), P(0), P(765)}. In another embodiment, the programming sequence preferably adopts a zigzag order, that is, non-consecutive page numbers such as {P(3), P(6), P(4), P 764), P(0), P(765)} to conform to the operating characteristics of the NV memory 120. In another embodiment, the user sets the programming sequence for non-reserved word-lines and the programming sequence for reserved word-lines, respectively. When writing the user data, the memory controller 110 adopts a preset writing mode and a programming sequence of the non-reserved word-lines. When writing the non-user data (such as the EOB information), the memory controller 110 uses SLC writing mode or the single page writing to write the non-user data to the NV memory 120 according to the reserved word-line programming sequence. Through the SLC writing mode or the single page writing, the memory controller 110 can write the non-user data into any reserved word-line of the plurality of reserved word-lines. In addition, the memory controller 110 can write non-user data to any reserved word-line of the plurality of reserved word-lines and write a backup of the non-user data to the other reserved word-line of the plurality of reserved word-lines.

Figure 5:
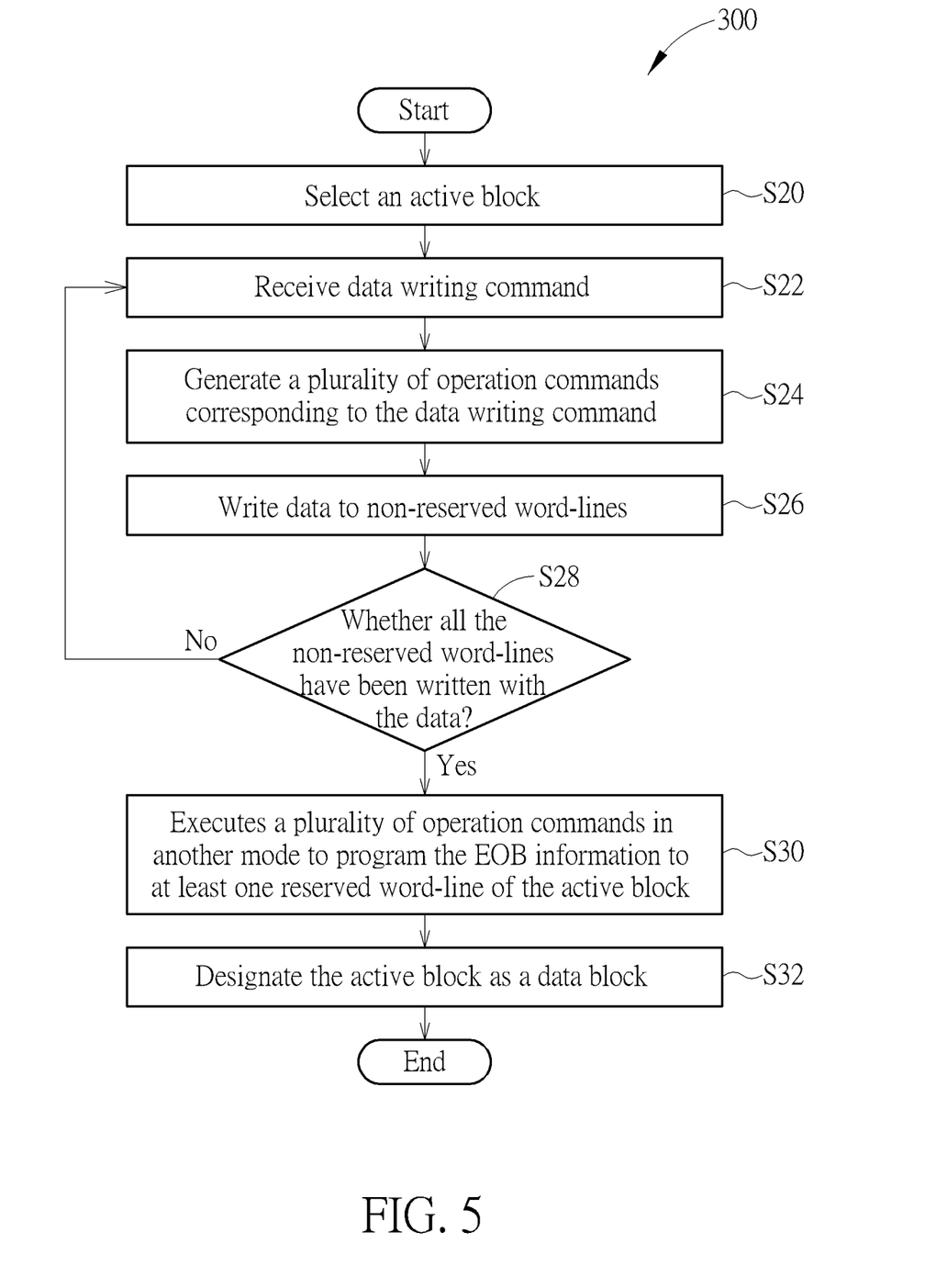
FIG. 5 shows an operation flow of the method shown in FIG. 2 according to an embodiment.

FIG. 5 shows an operation flow 300 of the method shown in FIG. 2 according to an embodiment. For example, the controller such as the memory controller 110 can perform the operations of the operation flow 300 under the control of the processing circuit such as the microprocessor 112.

In the step S20, the memory controller 110 selects a block as an active block (also referred to as an "acting block") for storing the user data, and the active block comprises the M word-lines {WL(0), WL(1), WL(2), ... WL(M-3), WL(M-2), WL(M-1)}. After the data storage device 100 completes the initialization, the memory controller 110 will select a block from the NV memories 120 as an active block. The active block can be used to store the user data from the host device 50, or used as a destination block in the garbage collection program to store the valid user data from the source block, or used as a destination block in the wear-leveling program to store the user data from the source block.

In the step S22, the memory controller 110 can receive a data-writing command from the host device 50, wherein the data-writing command comprises at least one user data and at least one logical address, and the user data and the logical address are preferably one-to-one correspondence. In another embodiment, the data-writing command comprises at least one user data and at least one designated physical address, and the user data and the designated physical address are preferably one-to-one correspondence, and the memory controller 110 preferably programs the user data into the designated physical address. In addition, at least one user data can be stored in the memory of the host device 50 firstly, and then the memory controller 110 downloads at least one user data from the memory of the host device 50 according to the command of the data-writing command.

In the step S24, the memory controller 110 can generate a plurality of operation commands corresponding to a preset writing mode of the data-writing command. The memory controller 110 translates the data-writing commands into a plurality of operation commands of the preset writing mode according to the data-writing command, the programming sequence, and other parameters, so as to properly program at least one user data into the NV memory 120, wherein the storage address (physical address) of the at least one user data can be determined by the memory controller 110 or determined by the data-writing command.

In the step S26, the memory controller 110 executes the plurality of operation commands in the preset writing mode to program at least one user data to a non-reserved word-line in the active block. For example, the memory controller 110 executes a plurality of operation commands in the TLC writing mode to program at least one user data such as the user data (such as the user data {DATA(0), DATA(1), DATA(2), DATA(3), ... }) to at least one page (such as the pages {P(3), P(4), P(5), ... P(762), P(763), P(764)}) of the non-reserved word-lines (such as the word-lines {WL(1), WL(2), ... WL(M-3), WL(M-2)}), but the present invention is not limited thereto.

In the step S28, the memory controller 110 can check whether all the non-reserved word-lines have been written with the user data. For example, in the loop formed by the steps S22 to S28, the memory controller 110 can store the series of user data (such as user data {DATA(0), DATA(1), DATA(2), DATA(3), ... }) into the non-reserved word-lines (such as the word-lines {WL(1), WL(2), ... WL(M-3), WL(M-2)}) of the block in sequence, but the present invention is not limited thereto. When all the non-reserved word-lines have been written with the user data, the process goes to the step S30; otherwise, the process goes to the step S22.

In the step S30, the memory controller 110 executes a plurality of operation commands in another mode to program the EOB information to at least one reserved word-line of the active block, such as at least one word-line of the word-lines WL(0) and WL(M-1) (for example, the word-lines WL(0); for another example, the word-line WL(M-1); for another example, the word-lines WL(0) and WL(M-1)), but the present invention is not limited to this.

In the step S32, the memory controller 110 can designate the active block as a data block. When the EOB information is written in the active block, the data block can represent a fully programmed block, and the active block is changed to a block of data and no longer used to write with any user data.

Figure 6:
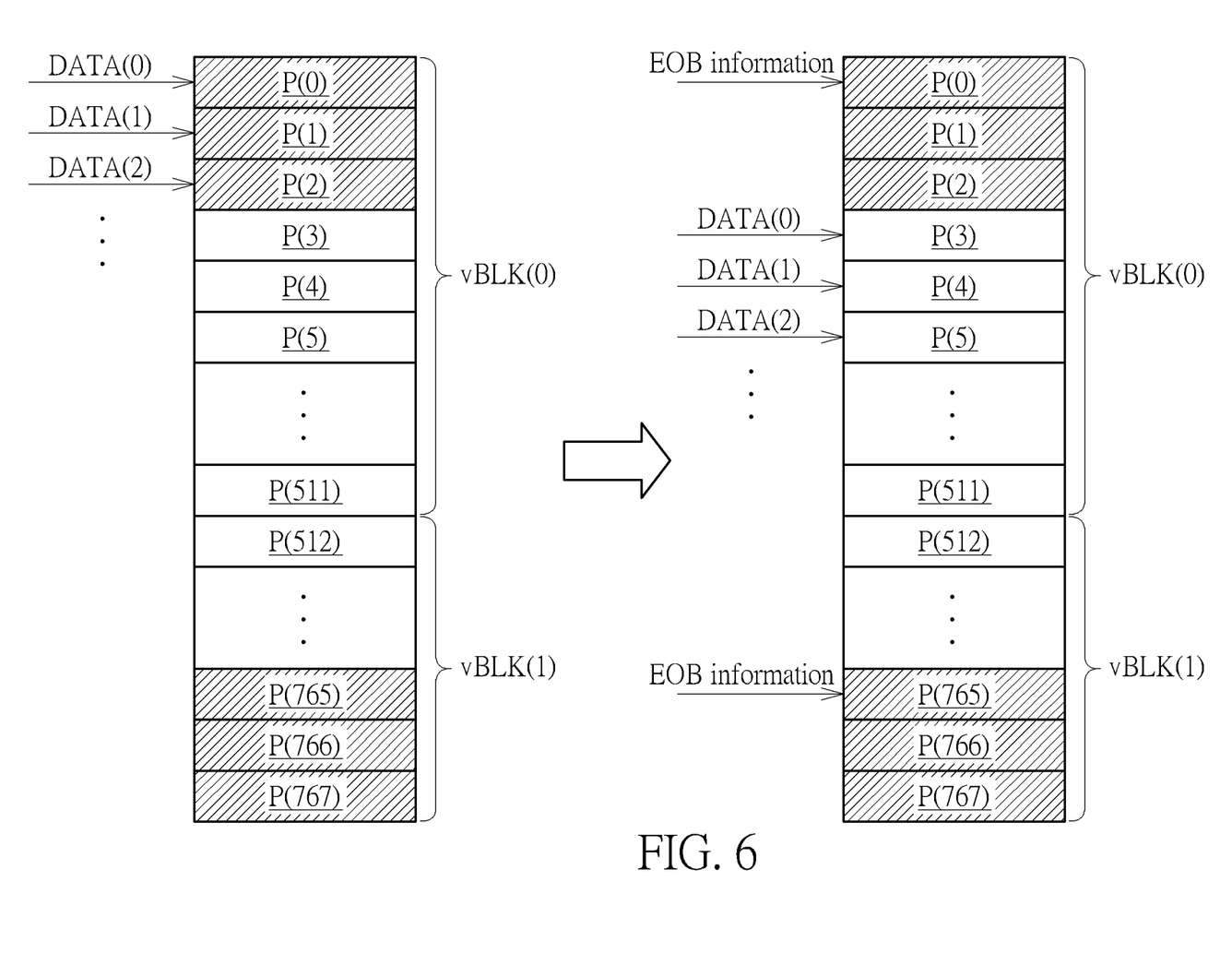
FIG. 6 shows a data writing sequence of the method shown in FIG. 2 according to another embodiment.

FIG. 6 shows a data writing sequence of the method shown FIG. 2 according to another embodiment. From the viewpoint of the data page, the word-line WL(0) can comprise three pages such as pages {P(0), P(1), P(2)} and the word-line WL(1) can comprise three pages such as pages P(3), P(4), P(5)}, and so on. For example, the block can comprise pages {P(0), P(1), P(2), P(3), P(4), P(5), P(6), ... P(763), P(764), P(765), P(766), P(767)}. As shown in the left half of FIG. 6, it is assumed that writing operations for each word-line in the block is performed by using the TLC writing mode, wherein the flash memory is implemented by the above planar NAND flash architecture. In this situation, a series of data such as the user data {DATA(0), DATA(1), DATA(2), DATA(3), ... } are usually written starting from page P(0). In contrast, the above method of the present invention can write the user data into a plurality of non-reserved word-lines such as word-lines {WL(1), ... WL(M-2)}, which in this embodiment can correspond to the pages {{P(3), P(4), P(5)}, ... {P(762), P(763), P(764)}}. As shown in the right half of FIG. 6, when the user data {DATA(0), DATA(1), DATA(2), DATA(3), ... } is to be written into this block, the memory controller 110 can start to write from the page P(3). With respect to the above reserved word-lines such as word-lines WL(0) and WL(M-1), the memory controller 110 can change to the SLC writing mode or only perform the single page writing.

Compared with the embodiment shown in FIG. 4, the block in this embodiment can comprise a plurality of virtual blocks. For example, the memory controller 110 can divide the block into two virtual blocks, such as the virtual blocks vBLK(0) and vBLK(1) shown in the right half of FIG. 6. The memory controller 110 can firstly write a first portion of the user data into a non-reserved word-line of the virtual block vBLK(0), and then, through the SLC writing mode or through the single page writing, the memory controller 110 can write the non-user data (for example, the EOB information of the virtual block vBLK(0)) to a first reserved word-line such as word-line WL(0) among these reserved word-lines. Next, the memory controller 110 can write a second portion of the user data into a non-reserved word-line of the virtual block vBLK(1), and then, through the SLC writing mode or through the single page writing, The memory controller 110 can write the non-user data (for example, the EOB information of the virtual block vBLK(1)) into a second reserved word-line such as a word-line WL(M-1) among the reserved word-lines. The content similar to the foregoing embodiment in this embodiment is not described herein again.

According to some embodiments, the way of dividing the virtual blocks in the block (for example, the size of the virtual block vBLK(0), the size of the virtual block vBLK(1), and/or the position of the boundary between the virtual block vBLK(0) and the virtual block vBLK(1)) can be varied. According to some embodiments, the number and the size of the virtual blocks in the block can be varied.

Figure 7:
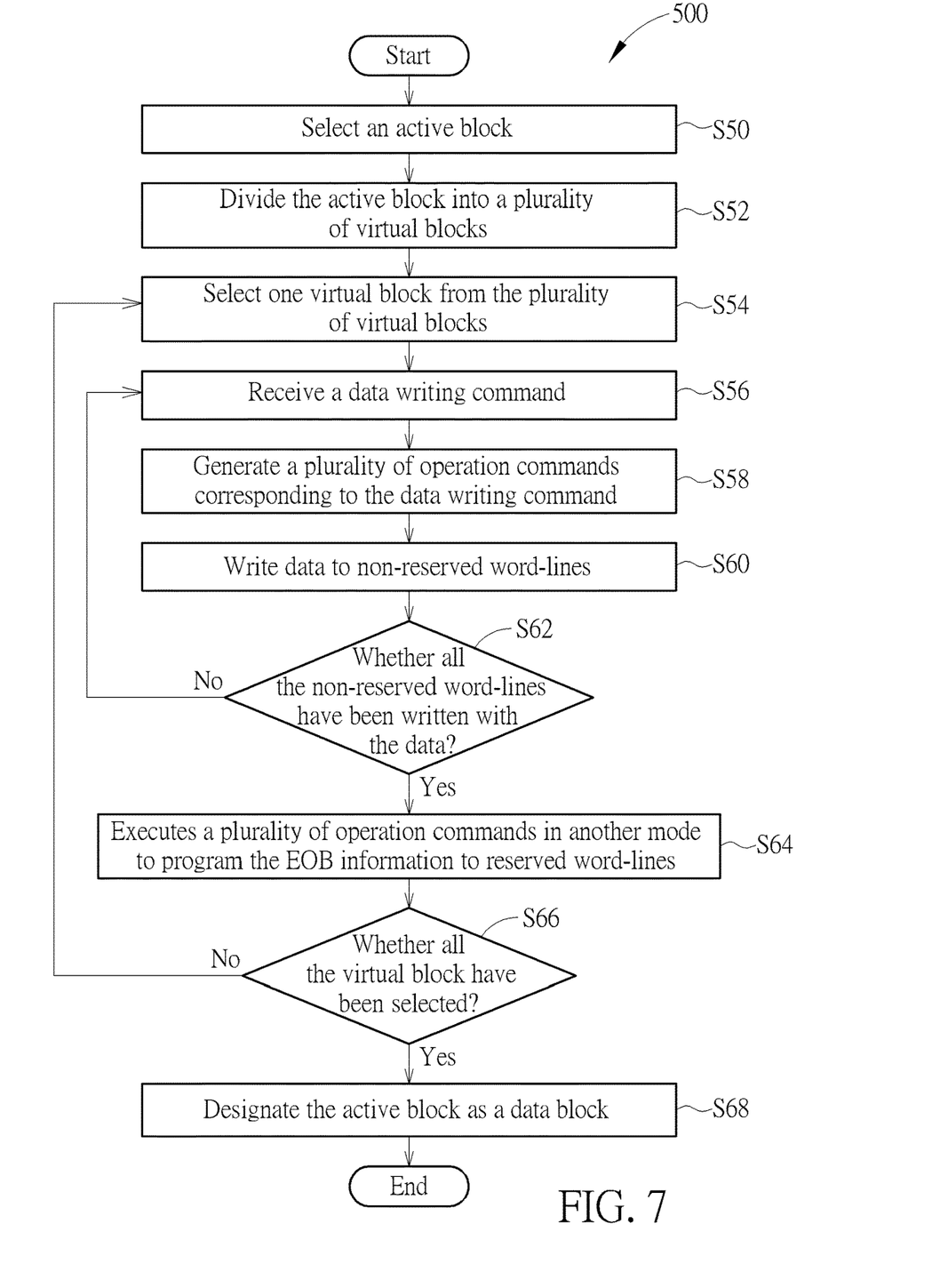
FIG. 7 shows an operation flow of the method shown in FIG. 2 according to another embodiment.

FIG. 7 shows an operation flow 500 of the method shown in FIG. 2 in another embodiment. For example, the controller such as the memory controller 110 can perform the operations of the operation flow 500 under the control of the processing circuit such as the microprocessor 112.

In the step S50, the memory controller 110 can select a block as an active block (also referred to as an "acting block") for storing the user data, and the active block comprises the M word-lines {WL(0), WL(1), WL(2), . . . WL(M-3), WL(M-2), WL(M-1)}.

In the step S52, the memory controller 110 can divide the active block into a plurality of virtual blocks, such as the above-mentioned virtual blocks vBLK(0) and vBLK(1), but the present invention is not limited thereto.

In the step S54, the memory controller 110 can select one virtual block from the plurality of virtual blocks, and in particular, select one virtual of the plurality of virtual blocks that has not been selected yet.

In the step S56, the memory controller 110 can receive a data-writing command from the host device 50. For example, the data-writing command comprises at least one user data and at least one logical address, and the user data and the logical address are preferably one-to-one correspondence. For another example, the data-writing command comprises at least one user data and at least one designated physical address. The user data and the designated physical address are preferably one-to-one correspondence, and the memory controller 110 preferably programs the user data to the specified physical address.

In the step S58, the memory controller 110 can generate a plurality of operation commands corresponding to a preset writing mode of the data-writing command.

In the step S60, the memory controller 110 can execute a plurality of operation commands in the preset writing mode to program at least one user data to a non-reserved word-line of the virtual block. For example, the memory controller 110 can execute a plurality of operation commands of the TLC writing mode to store at least one user data (such as a portion of the user data {DATA(0), DATA(1), DATA(2), . . . } to at least one page of the non-reserved word-line of the virtual block (For example, when the selected virtual block in the step S54 is the virtual block vBLK(0), the at least one page can comprise the pages {P(3), P(4), P(5), . . . P(511)}; for another example, when the selected virtual block in the step S54 is the virtual block vBLK(1), the at least one page can comprise the pages {P(512), . . . P(764)}), but the present invention is not limited thereto.

In the step S62, for the virtual block, the memory controller 110 can check whether all the non-reserved word-lines have been written with the user data. For example, in the loop formed in the steps S56 to S62, the memory controller 110 can store a portion of the series of user data (such as user data {DATA(0), DATA(1), DATA(2), DATA(3), . . . }) into the non-reserved word-lines of the virtual block in sequence, but the present invention is not limited thereto. When all the non-reserved word-lines have been written with the user data, the process goes to the step S64; otherwise, the process goes to the step S56.

In the step S64, the memory controller 110 can execute a plurality of operation commands in another mode to program the EOB information to the reserved word-lines of the virtual block, such as one word-line of the word-lines WL(0) and WL(M-1), but the present invention is not limited thereto. For example, when the virtual block represents the virtual block vBLK(0), the memory controller 110 can program the EOB information of the virtual block vBLK(0) to the reserved line of the virtual block vBLK(0), such as the word-line WL(0). For another example, when the virtual block represents the virtual block vBLK(1), the memory controller 110 can program the EOB information of the virtual block vBLK(1) to the reserved word-line of the virtual block vBLK(1), such as a word-line WL(M-1).

In the step S66, the memory controller 110 can determine whether all the virtual blocks (among the plurality of virtual blocks) have been selected. If yes, go to the step S68; otherwise, go to the step S54.

In the step S68, the memory controller 110 can designate the active block as a data block. For example, the data block can represent a fully programmed block. The content similar to the foregoing embodiment in this embodiment is not described herein again.

According to some embodiments, a writing mode employed to write user data to any non-reserved word-line of the non-reserved word-lines in the block (for example, each non-reserved word-line) can be Xth order cell writing mode (whose order is equal to X) and the number of pages in the non-reserved word-line can be equal to X, wherein X can be a positive integer, especially a positive integer greater than one. For example: When X≥3, the non-reserved word-line can comprise at least three pages.

The methods of the present invention (for example, the operation flows 300 and 500 thereof) and corresponding devices (for example, the microprocessor 112, the memory controller 110, and the data storage device 100) can properly control the operations of the controller to avoid shortening the lifetime of the data storage device. In addition, almost no additional cost is required for the implementation of the embodiments of the present invention. Therefore, the problems of the associated art can be solved without increasing the overall cost much. In contrast to the associated art, the present invention can achieve the optimal performance of a data storage device without side effects or less likely to cause side effects.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for controlling operations of a data storage device, the data storage device comprising a non-volatile (NV) memory comprising a plurality of NV memory elements, the method comprising:
   selecting a block from multiple blocks of a NV memory element of the plurality of NV memory elements, the block comprising a plurality of word-lines;
   designating a first word-line and a last word-line of the selected block as reserved word-lines, and designating the remaining word-lines of the selected block as non-reserved word-lines;
   receiving a data-writing command from a host device, wherein the data-writing command is one of a plurality of host device commands from the host device;
   generating a plurality of operating commands corresponding to the data-writing command, and sending the plurality of operating commands to the NV memory to perform data-writing on a plurality of non-reserved word-lines of the block, wherein data writing is performed through a triple level cell (TLC) writing mode to make each non-reserved word-line of the plurality of non-reserved word-lines comprise multiple pages;
   modifying physical addresses respectively pointing to at least one portion of word-lines of the block to write a series of data to the plurality of non-reserved word-lines and avoid writing the series of data to the first word-line of the block, wherein the plurality of reserved word-lines comprise the first word-line; and
   writing user data into a reserved word-line of the plurality of reserved word-lines through a single level cell (SLC) writing mode, to make the reserved word-line comprise a single page.

2. The method of claim 1, further comprising:
   writing an end-of-block (EOB) information of the block into the reserved word-line.

3. The method of claim 2, wherein the block comprises a plurality of virtual blocks, and the EOB information is an EOB information of a virtual block of the plurality of virtual blocks.

4. The method of claim 2, further comprising:
   writing a backup of the EOB information to another reserved word-line of the plurality of reserved word-lines via the SLC writing mode to make the another reserved word-line comprise a single page.

5. The method of claim 1, further comprising:
   writing other user data to another reserved word-line of the plurality of reserved word-lines via the SLC writing mode to make the another reserved word-line comprise a single page.

6. A data storage device, comprising:
   a non-volatile (NV) memory, for storing information, wherein the NV memory comprises a plurality of NV memory elements; and
   a controller, coupled to the NV memory, for controlling operations of the data storage device, wherein the controller comprises:
      a processing circuit, for controlling the controller according to a plurality of host device commands from a host device to allow the host device to access the NV memory through the controller, wherein:
      the controller selects a block from a plurality of blocks of a NV memory element of the plurality of NV memory elements, the block comprising a plurality of word-lines;
      the controller designates a first word-line and a last word-line of the selected block as reserved word-lines, and designates the remaining word-lines of the selected block as non-reserved word-lines;
      the controller receives a data-writing command from a host device, wherein the data-writing command is one of the plurality of host device commands from the host device;
      the controller generates a plurality of operating commands corresponding to the data-writing command, and sends the plurality of operating commands to the NV memory to perform data-writing on a plurality of non-reserved word-lines of the block, wherein the controller performs the data-writing through a triple level cell (TLC) writing mode to make each non-reserved word-line of the plurality of non-reserved word-lines comprise multiple pages;
      the controller modifies physical addresses respectively pointing to at least one portion of word-lines of the block to write a series of data to the plurality of non-reserved word-lines and avoid writing the series of data to the first word-line of the block, wherein the plurality of reserved word-lines comprise the first word-line; and
      the controller writes user data into a reserved word-line of the plurality of reserved word-lines through a single level cell (SLC) writing mode, to make the reserved word-line comprise a single page.

7. The data storage device of claim 6, wherein the controller writes an end-of-block (EOB) information of the block into the reserved word-line.

8. A controller of a data storage device, the data storage device comprising the controller and a non-volatile (NV) memory comprising a plurality of NV memory elements, the controller comprises:
   a processing circuit, for controlling the controller according to a plurality of host device commands from a host device to allow the host device to access the NV memory through the controller, wherein:
   the controller selects a block from a plurality of blocks of a NV memory element of the plurality of NV memory elements;
   the controller designates a first word-line and a last word-line of the selected block as reserved word-lines, and designates the remaining word-lines of the selected block as non-reserved word-lines;
   the controller receives a data-writing command from a host device, wherein the data-writing command is one of a plurality of host device commands from the host device;
   the controller generates a plurality of operating commands corresponding to the data-writing command, and sends the plurality of operating commands to the NV memory to perform data-writing on a plurality of non-reserved word-lines of the block, wherein the controller performs the data-writing through a triple level cell (TLC) writing mode to make each non-reserved word-line of the plurality of non-reserved word-lines comprise multiple pages;
   the controller modifies physical addresses respectively pointing to at least one portion of word-lines of the block to write a series of data to the plurality of non-reserved word-lines and avoid writing the series of data to the first word-line of the block, wherein the plurality of reserved word-lines comprise the first word-line; and the controller writes user data into a reserved word-line of the plurality of reserved word-lines through a single level cell (SLC) writing mode, to make the reserved word-line comprise a single page.

9. The controller of claim 8, wherein the controller writes an end-of-block information (EOB information) of the block into the reserved word-line.

10. A method of data writing, which is applicable to a data storage device, the method comprising:

selecting a block as an active block, the block being selected from a plurality of blocks comprised in the data storage device;

dividing a plurality of word-lines of the active block into at least one reserved word-line and a plurality of non-reserved word-lines, the at least one reserved word-line comprising at least one of a first word-line and a last word-line of the active block;

programming a first type of data to the non-reserved word-lines in a preset writing mode;

programming a second type of data to the at least one reserved word-line in a non-preset writing mode, wherein the preset writing mode is programmable with more data to each word-line of the word-lines than the non-preset writing mode; and modifying physical addresses respectively pointing to at least one portion of word-lines of the block to write a series of data to the plurality of non-reserved word-lines and avoid writing the series of data to the first word-line of the block, wherein the plurality of reserved word-lines comprise the first word-line.

* * * * *